Dec. 9, 1930.  C. G. MITCHELL  1,784,742
AUTOMATIC TRANSMISSION
Filed Aug. 4, 1930  6 Sheets-Sheet 1

Inventor
C. G. Mitchell
By Clarence A. O'Brien
Attorney

Dec. 9, 1930.  C. G. MITCHELL  1,784,742
AUTOMATIC TRANSMISSION
Filed Aug. 4, 1930  6 Sheets-Sheet 2

Inventor
*C.G. Mitchell*

By *Clarence A. O'Brien*
Attorney

Dec. 9, 1930.  C. G. MITCHELL  1,784,742
AUTOMATIC TRANSMISSION
Filed Aug. 4, 1930  6 Sheets-Sheet 3

Fig. 3.

Inventor
C. G. Mitchell

By Clarence A. O'Brien
Attorney

Dec. 9, 1930.  C. G. MITCHELL  1,784,742
AUTOMATIC TRANSMISSION
Filed Aug. 4, 1930   6 Sheets-Sheet 5

Inventor
C. G. Mitchell
By Clarence A. O'Brien
Attorney

Patented Dec. 9, 1930

1,784,742

UNITED STATES PATENT OFFICE

CHARLES GOODYEAR MITCHELL, OF MIAMI, FLORIDA

AUTOMATIC TRANSMISSION

Application filed August 4, 1930. Serial No. 473,009.

The present invention relates to new and useful improvements in transmission generally and more particularly to a transmission for use in automotive vehicles, but it is to be understood that a transmission in accordance with this invention may be utilized for any purpose for which same is found adapted and desirable.

The primary object of this invention is to provide, in a manner as hereinafter set forth, a transmission of the change speed type, which will be automatic in operation.

Another important feature of the invention resides in the provision of novel means for retarding the speed of operation of the engine during the periods when the various speed changes in the transmission are being effected.

Other objects of the invention are to provide an automatic transmission of the character described, which will be comparatively simple in construction, strong, durable, highly efficient in its use, and which may be manufactured at low cost.

All of the foregoing and still further objects and advantages of the invention may become apparent from a study of the following specification, taken in connection with the accompanying drawings, wherein like characters of reference designate corresponding parts throughout the several views, and wherein:

Figure 2 is a horizontal sectional view, taken substantially on the line 2—2 of Figure 1, looking in the direction indicated by the arrows.

Figure 4 is a vertical longitudinal sectional view, taken substantially on the line 4—4 of Figure 3.

Referring to the drawings in detail, it will be seen that the reference numeral 1 designates the floor board of an automobile, 2 is the toe board, 3 the dash board, 4 is the cowl and 5 is the instrument board or panel.

A conventional carburetor is designated by the reference numeral 6.

The transmission constituting this invention comprises a housing designated generally at 7, said housing having its open top closed by the removable cover plate 8, secured in place by any suitable means, such as the screws 9. The housing 7 is of appropriate size and configuration and is disposed rearwardly of the engine (not shown) of the automobile beneath the floor board 1 and the toe board 2.

Figures 1, 14, 15:
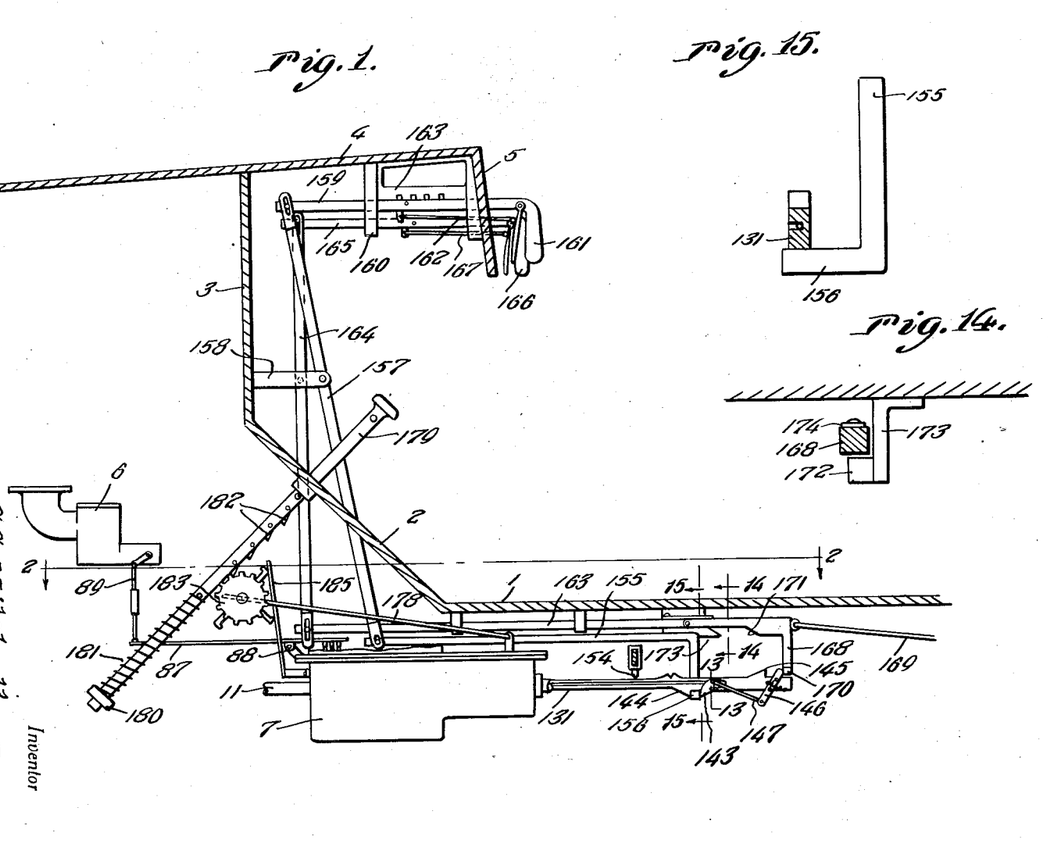
Figure 1 is a view in side elevation showing a transmission in accordance with this invention, in position on an automobile.
Figure 14 is a detail cross sectional view, taken substantially on the line 14—14 of Figure 1, looking in the direction indicated by the arrows.
Figure 15 is a cross sectional view, taken substantially on the line 15—15 of Figure 1, looking in the direction indicated by the arrows.

As best seen in Figures 1 and 4 of the drawings, the housing 7 is formed to provide a rearwardly disposed integral extension 10 having its bottom wall disposed above the plane of the bottom wall of said housing 7.

A drive shaft 11 is operatively connected to the engine of the automobile and extends rotatably and longitudinally through the housing 7 and projects into the extension 10, and has its rear end portions journaled through the bearing 12 provided therefor.

A sleeve 13 is splined for longitudinal movement on the drive shaft 11, and has formed on its forward end portion, an enlarged head 14. A tapered portion 15 is disposed between the main body of the sleeve 13 and the head 14, and has formed therein a spiral groove 16. The sleeve 13 is further provided with a series of annular teeth 17. An annulus 18 is fixed on the drive shaft 11, rearwardly of the sleeve 13 by any suitable means, such as the cross pin 19 (see Figure 4) and formed integrally on diametrically opposite sides of said annulus are the forwardly diverging arms 20 to the free ends of which are pivotally connected the toothed segments 21, which mesh with the teeth 17 on the sleeve 13. Extensions 22 project from the segments 21, and have mounted on their free ends the weights 23. The segments 21 are normally retained yieldingly in the position illustrated in Figure 3 of the drawings, by the coil springs 24 having one end anchored to the arms 20 and their opposite ends anchored to said segments.

A shaft 25 is also mounted longitudinally for rotation in the housing 7 in spaced parallelism with the drive shaft 11, and is operatively connected to said drive shaft 11, by the train of reduction gearing 26.

Figure 3:
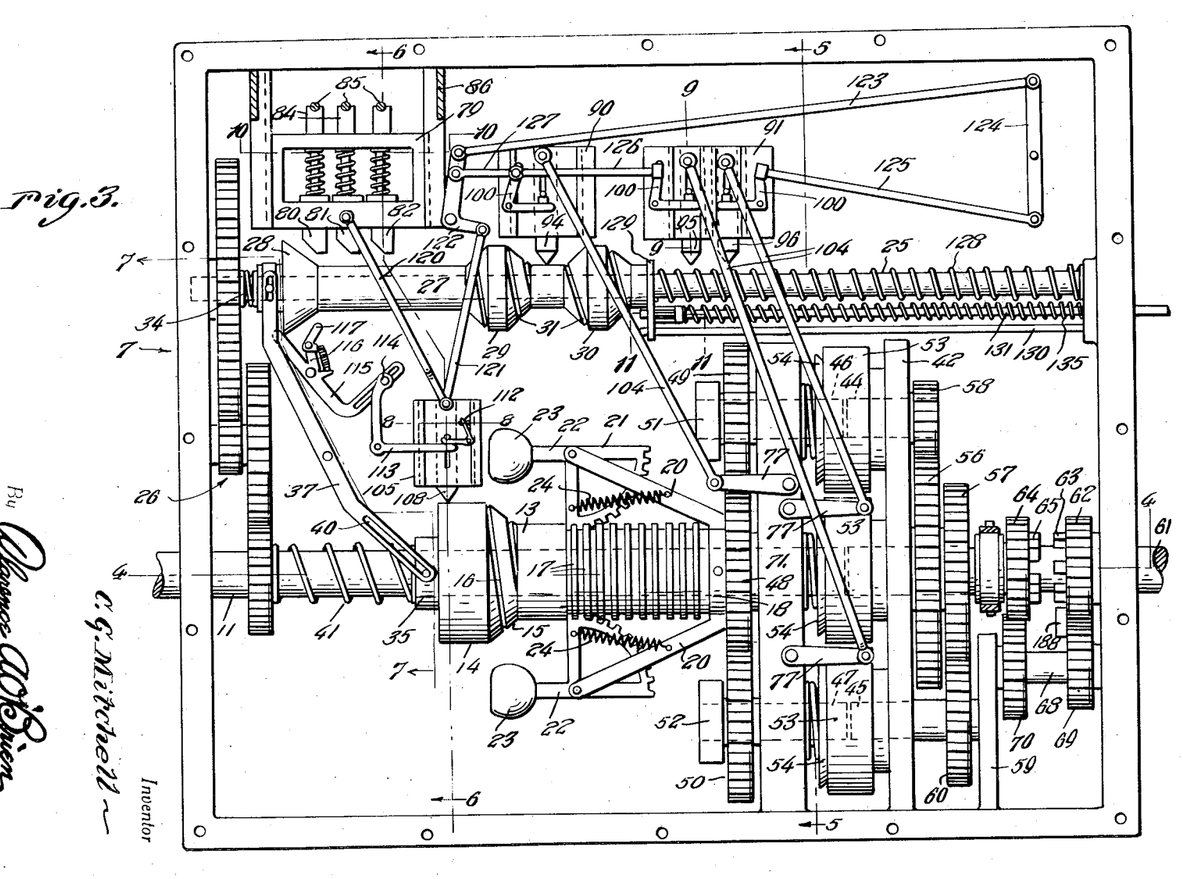
Figure 3 is a view in top plan, looking into the housing with the cover plate removed.
Figure 7:
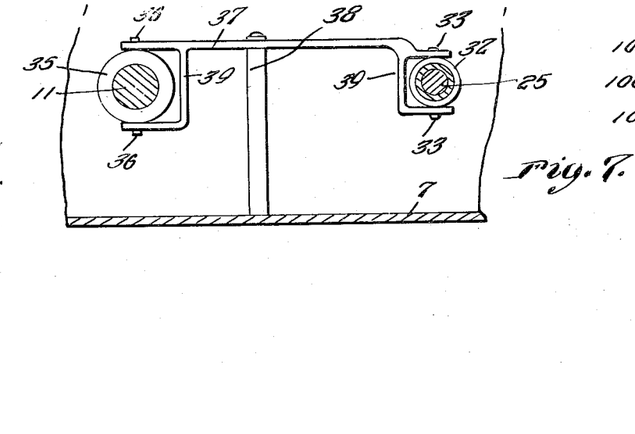
Figure 7 is a detail sectional view, taken substantially on the line 7—7 of Figure 3.

An elongated tube 27 is splined on the shaft 25 and has formed on its forward end the conical head 28. Also formed integrally on the tube 27, in spaced relation to the head 28 are the spaced enlargements 29 and 30, having spirally grooved opposite side walls 31. As best seen in Figures 3 and 7 of the drawings, a ring 32 is rotatably and slidably mounted on the shaft 25 and engageable with the forward end of the tube 27 and has projecting from diametrically opposite sides thereof the pins 33. A cushioning spring 34 is mounted on the shaft 25 and interposed between the ring 32 and the adjacent ear of the train 26. A ring 35 is rotatably and slidably mounted on the drive shaft 11, and engageable with the forward end of the sleeve 13 and has projecting from diametrically opposite sides the pins 36. A lever 37 has an intermediate portion pivotally secured for swinging movement on a suitable support 38 in the housing 7 and said lever has the yokes 39 on its opposite ends having the slots 40, through which the pins 33 and 36 extend. In this manner, the lever 37 is operatively connected to the rings 32 and 35. A coil spring 41 is mounted on the drive shaft 11 between the ring 35 and the adjacent gear of the train 26, for yieldingly urging said ring 35 against the sleeve 13 and thus urging said sleeve 13 rearwardly on the drive shaft 11.

A bearing plate 42 is mounted transversely in an intermediate portion of the extension 10 of the housing 7, in spaced opposed relation to the bearing plate 12. An intermediate stub shaft 43 (see Figure 4) extends rotatably through the bearing plate 42, and is in longitudinal alignment with the drive shaft 11, said stub shaft 43 having its forward end disposed closely adjacent the rear end of the drive shaft.

As indicated in broken lines in Figure 3 of the drawings, stub shafts 44 and 45 also extend rotatably through the bearing plate 42 on opposite sides of the stub shaft 43. Stub shafts 46 and 47 extend rotatably through the bearing plate 12 on opposite sides of the drive shaft 11. A gear 48 is fixed on the drive shaft 11 adjacent the forward side of the bearing plate 12 and has its diametrically opposite sides in mesh with the gears 49 and 50 fixed on the forward end portions of the stub shafts 46 and 47 respectively. The forward ends of the shafts 46 and 47 may be journaled in the upstanding bearings 51 and 52 respectively, which are supported in the housing 7. Co-acting clutch devices 53 and 54 are mounted on the adjacent ends of the stub shafts 44 and 46, on the adjacent ends of the stub shaft 43 and the drive shaft 11, and on the adjacent ends of the stub shafts 45 and 47.

Each of the clutch elements 54 is splined on its shaft and any desired type of clutch may be used, which is found suitable. In the present instance, clutches of the cone type have been provided. The cones 54 are normally held yieldingly in disengaged position by the coil springs 55 (see Figure 4). A large and a comparatively small gear 56 and 57 are keyed on the stub shaft 43, and the gear 56 is in mesh with a gear 58, fixed on the rear end portion of the stub shaft 44. The stub shaft 45 is of greater length than the shaft 44, and has its rear end journaled in a bearing 59 and further has fixed thereon a gear 60, in mesh with the gear 57. A propeller shaft 61 extends rotatably into the rear side of the extension 10 of the housing 7 and has its inner end socketed to rotatably receive the reduced end portion of the stub shaft 43, as best seen in Figure 4 of the drawings. A gear 62 is fixed on the inner end portion of the propeller shaft 61 and has formed on its inner side the clutch teeth 63. A gear 64 is splined on the stub shaft 43, and has formed on one side the clutch teeth 65 for engagement with the clutch teeth 63 for locking the stub shaft 43 directly to the propeller shaft 61 when it is desired. A lever 66 is pivotally mounted for swinging movement as at 67 in the extension 10 of the housing 7 and has its lower end operatively connected to the gear 64, to move said gear longitudinally on the stub shaft 43, upon swinging movement of the lever.

As clearly seen in Figure 4, the lever 66 is operable through a slot provided therefor in the cover of the housing and the means of operating the lever will be more fully hereinafter set forth. A counter shaft 68 is mounted in the housing and has fixed thereon a gear 69 which is constantly in mesh with the gear 62 on the propeller shaft 61. Another gear 70 is fixed on the counter shaft 68 and is operatively engaged by the gear 64 on the stub shaft 43, when said gear 64 is shifted forwardly.

Figure 5:
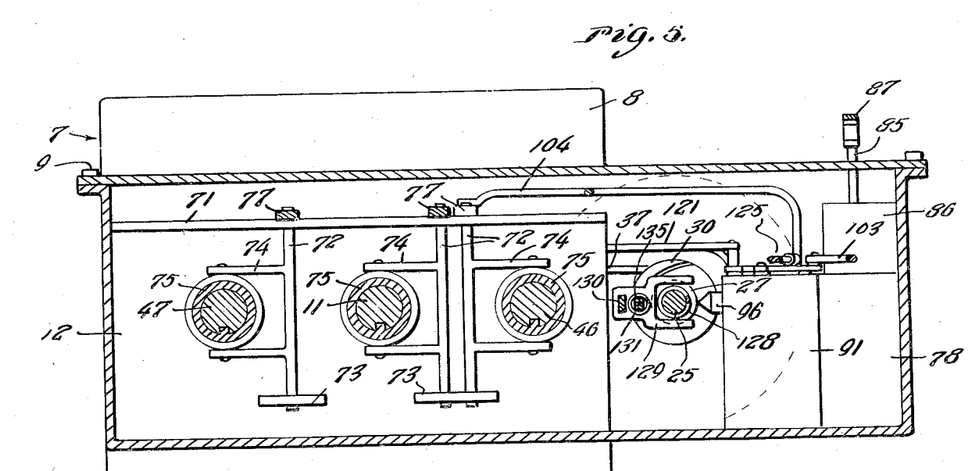
Figure 5 is a vertical cross sectional view, taken substantially on the line 5—5 of Figure 3, looking in the direction indicated by the arrows.

A flat metallic strip 71 is mounted on top of the bearing plate 12 and projects rearwardly therefrom as best seen in Figures 3 and 4. Vertically disposed shafts 72 are journaled in the strip 71 and the bearings 73 which project rearwardly from the plates 12 adjacent the lower edge thereof. Referring to Figure 5 of the drawings, it will be seen that each of the shafts 72 has formed thereon a pair of right angularly disposed spaced arms 74, which extend on opposite sides of the stub shafts 46 and 47 and the drive shaft 11. Each pair of the arms is operatively connected to a collar 75, slidably mounted on the respective shafts. A coil spring 76 is disposed between each of the collars and the adjacent cones 54 of the clutches 53. It will thus be seen that upon rocking movement of the shafts 72 in one direction, the cones 54 will be yieldingly urged toward the clutches 53 against the tension of the springs 55.

An arm 77 is fixed on the upper end portion of each of the shafts 72.

Figure 6:
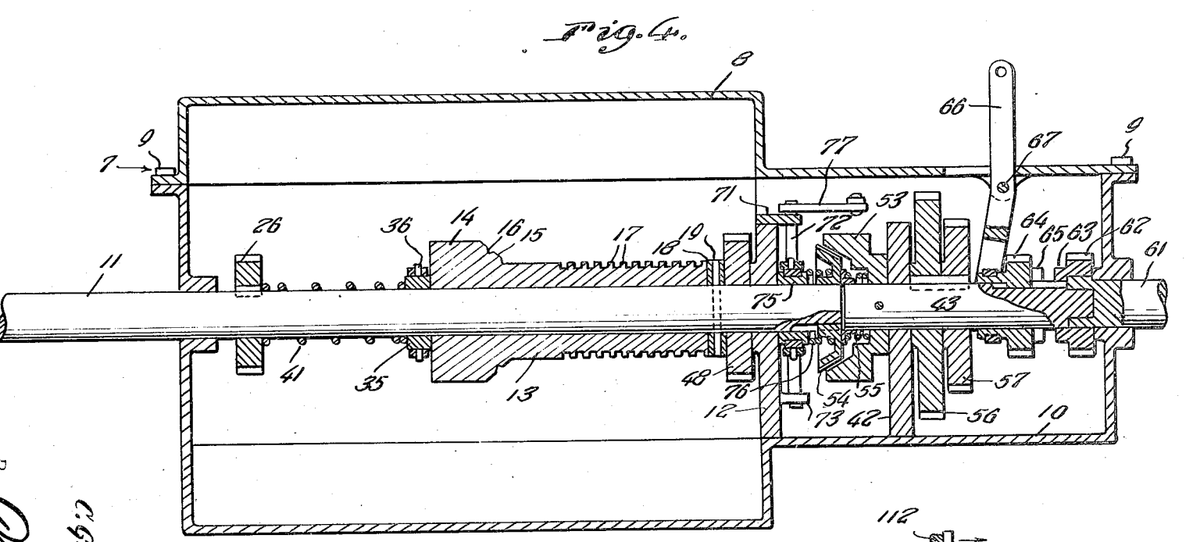
Figure 6 is a vertical cross sectional view, taken substantially on the line 6—6 of Figure 3, looking in the direction indicated by the arrows.

A channeled block 78 is mounted in one side portion of the housing 7, adjacent the forward end of said housing and mounted for horizontal sliding movement in said block is a substantially rectangular frame 79, which, in turn, has slidably mounted therein the spring controlled plungers 80, 81, and 82, which are yieldingly urged toward the tube 27. The ends of the plungers, which are adjacent the tube 27 are bevelled in the manner clearly seen in Figure 3 of the drawings, for engagement with the cone 28 on the forward end of the tube 27. Each of the plungers has formed thereon a flange 83, for limiting the sliding movement of said plungers under the impulse of their respective springs. Referring to Figure 6 of the drawings, it will be seen that the opposite ends of the plungers have fixed thereon the bevelled heads 84 engaged with the adjacent ends of the rods 85 which extend slidably through the bracket 86 provided therefor and through the cover 8 of the housing 7. Each of the rods 85 has its outer or upper end engaged with a lever 87 (see Figure 1), which is pivotally mounted for swinging movement as at 88. The forward end portion of the lever 87 is operatively connected to the throttle valve of the carburetor 6, by the adjustable link 89. It may be well to here mention that the bracket 86 is mounted on top of the plug 78.

It will thus be seen that upon sliding movement of any of the plungers 80, 81, and 82, the lever 87 is actuated, in a manner to move the throttle valve of the carburetor 6, toward its closed position. This operation takes place when the plungers are moved in a direction away from the tube 27.

Figures 9, 11, 12, 13:
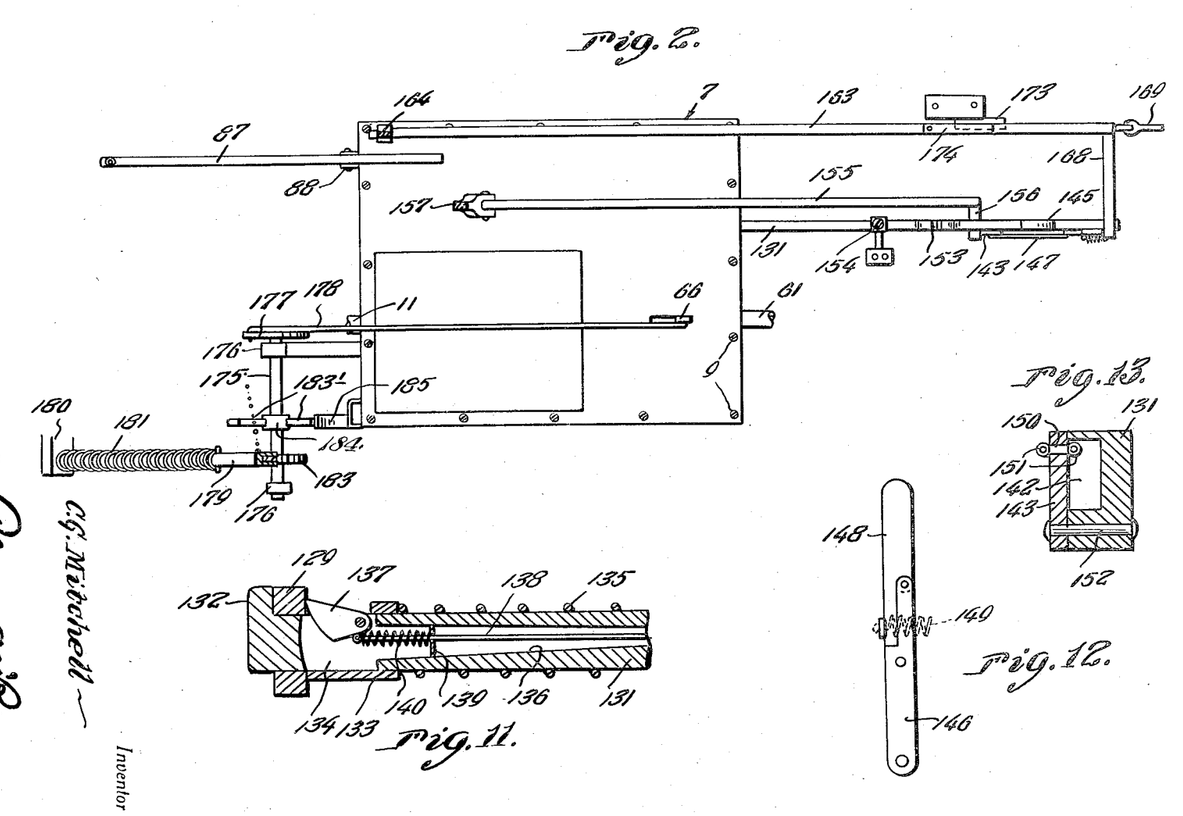
Figure 9 is a detail sectional view, on an enlarged scale, taken substantially on the line 9—9 of Figure 3.
Figure 11 is a fragmentary detail view, in longitudinal section taken substantially on the line 11—11 of Figure 3.
Figure 12 is a detail view, on an enlarged scale and in elevation, showing the sectional lever constituting one of the elements for operatively connecting the emergency brake of an automobile with a release mechanism in the transmission for placing said transmission in neutral.
Figure 13 is a detail cross sectional view, taken substantially on the line 13—13 of Figure 1.

Referring now to Figures 3, 6, and 9, of the drawings, it will be seen that a single channeled bracket 90 and a double channeled bracket 91 are mounted in the housing 7, in spaced relation to each other, adjacent the shaft 25. Polygonal sleeves 92 are mounted for horizontal sliding movement in the brackets 90 and 91, for movement toward and away from the shaft 25, one of said sleeves being mounted in the bracket 90 and the pair of said sleeves being mounted in the bracket 91. Coil springs 93 are connected to each of the sleeves and the brackets for yieldingly urging the sleeves toward the shaft 25 (see Figure 9). Plungers 94, 95, and 96 are disposed for sliding movement in the sleeves 92, spring pressed latches 97 are mounted on the sleeves 92 and engageable in openings provided therefor in the plungers 94, 95 and 96, for releasably locking the sleeves and the plungers together. The aforesaid openings are disposed transversely through the plungers.

Operating bolts 98 are mounted slidably in each of the openings in the plungers for engagement with the latches for disengaging the said latches from the plungers. Each of the sleeves 92 has formed in its upper side a slot 99, through which the operating bolts 98 extend. The outer end portions of each of the operating bolts 98 is provided on one side with a cam surface for engagement by the bell crank levers 100, which are pivotally mounted for swinging movement on the brackets 90 and 91. A pin 101 projects from each of the plungers 94, 95 and 96, closely adjacent the operating bolts 98, on the sides of said bolts opposite to the bell crank levers 100, said pins paralleling the operating bolts. An upstanding arm 102 is rigidly connected to each of the sleeves 92, through the medium of the screws 103 and rods 104 are pivotally connected at their opposite ends to the free ends of said arms 102 and the arms 77 on the shafts 72.

Referring now to Figures 3 and 6 of the drawings, it will be seen that a bracket 105 is mounted in the housing 7 and projects between the drive shaft 11 and the shaft 25, adjacent the head 14 of the sleeve 13. A sleeve 106 is mounted for horizontal sliding movement in the bracket 105 and is yieldingly urged toward the drive shaft 11, by the coil spring 107. The spring 107 is disposed in a recess provided therefor in the bracket 105 and has one end connected to said bracket and its opposite end connected to the sleeve 106.

Figure 8:
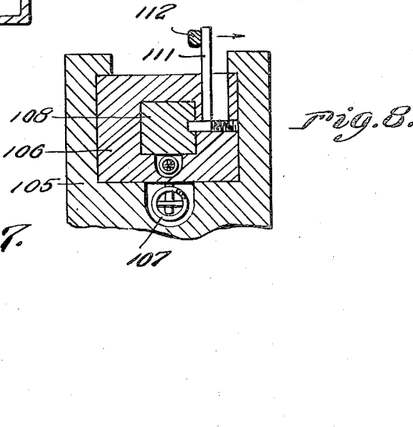
Figure 8 is a sectional view, taken substantially on the line 8—8 of Figure 3.

A plunger 108 is mounted for sliding movement in the sleeve 106 and has projecting therefrom an upstanding pin 109 which is operable through a slot 110, provided therefor in the sleeve 106. As best seen in Figure 8 of the drawings, a keeper 111 is slidably mounted in a recess provided therefor in the sleeve 106 and is engageable with the plunger 108, for locking said plunger and the sleeve together. A coil spring is engaged with the keeper 111 for yieldingly urging the same into engaging position with the plunger 108. The keeper 111 projects upwardly and is engaged by one end portion of a bell crank 112 mounted for swinging movement on the free end of the bracket 105. One side of the opposite end portion of the bell crank 112 is engageable with the free end portion of the pin 109. A lever 113 has one end portion engaged with the bell crank lever 112, on the side of said lever opposite to the pin 109, the lever 113 being angular and pivotally mounted for swinging movement in the housing 7, adjacent the bracket 105. The opposite end of the angular lever 113 is coupled by a pin and slot connection 114 to the angular lever 115, which is also pivotally mounted for swinging movement in the housing 7. The lever 115 has its forward end disposed in the path of the cone 28, on the tube 27, in such manner that the end of the lever 115 to which the lever 113 is connected, will be swung toward the tube 27, when said tube and the cone 28 move forwardly on the shaft 25.

An integral lug 116 is formed on an intermediate portion of the lever 115 and pivotally mounted for swinging movement on said lug is a finger 117 having formed thereon a stop 118, (see Figure 6), engageable with the adjacent side of the lug 116, in a manner to limit the swinging movement of the finger 117, in a rearward direction under the impulse of the spring 119, which has one end anchored to the lever 115 and its opposite end anchored to said lug 118. The finger 117 is also disposed in the path of the cone 28, and is engaged by said cone when the tube 27 moves rearwardly on the shaft 25, in a manner to swing the end of the lever 115, which is connected to the lever 113, toward the drive shaft 11. The pivotal mounting of the finger 117 will permit the passage of the cone 28 forwardly without operating the lever 115, as will be apparent.

A rod 120 has one end pivotally connected to the frame 79, which carries the plungers 80, 81, and 82, and said rod has its opposite end pivotally connected to the upper end of the sleeve 106 in the bracket 107. A rod 121 also has one end pivotally connected to the upper end portions of the sleeve 106 and has its opposite end pivotally connected to the bell crank lever 122, pivotally mounted for swinging movement in the housing 7. A rod 123 operatively connects the opposite end portion of the bell crank 122 with the rocker arm 124, and said rocker arm 124 is operatively connected with the adjacent bell crank lever 100 on the brackets 91 by the rod 125.

The other bell crank 100, which is on the bracket 91 is connected to the bell crank 100 which is on the bracket 90 by the rod 126, and the bell crank 100 which is on the bracket 90 is in turn connected to the bell crank lever 122 by the rod 127.

A coil spring 128 is mounted on the rear portion of the shaft 25, and is engaged with the rear end of the tube 27, in a manner to yieldingly urge said tube forwardly. A yoke 129 is slidably mounted on a stationary guide rod 130, which is supported in the rear vertical wall of the housing 7 and extends forwardly in spaced parallelism with the shaft 25. A rod 131 of polygonal cross section extends slidably through the rear wall of the housing 7 and projects into said housing intermediate the shaft 25 and the guide rod 130. The polygonal rod 131 has its forward end portion extending slidably through the yoke 129 and has formed integrally on its forward end the laterally extending lug 132 (see Figure 11) which is engageable with the forward side of the yoke 129. It may be well to here mention that the arms of the yoke 129 extend on opposite sides of the shaft 25, and the coil spring 128, and said yoke is engageable with the rear end of the tube 27. The yoke 129 will be moved rearwardly with the rod 131, by reason of the lug 132. Referring again to Figure 11, it will be seen that a sleeve 133 is mounted on the forward portion of the rod 131 and is engaged with the rear side of the yoke 129.

Figures 9, 10, 16, 17, 18, 19:
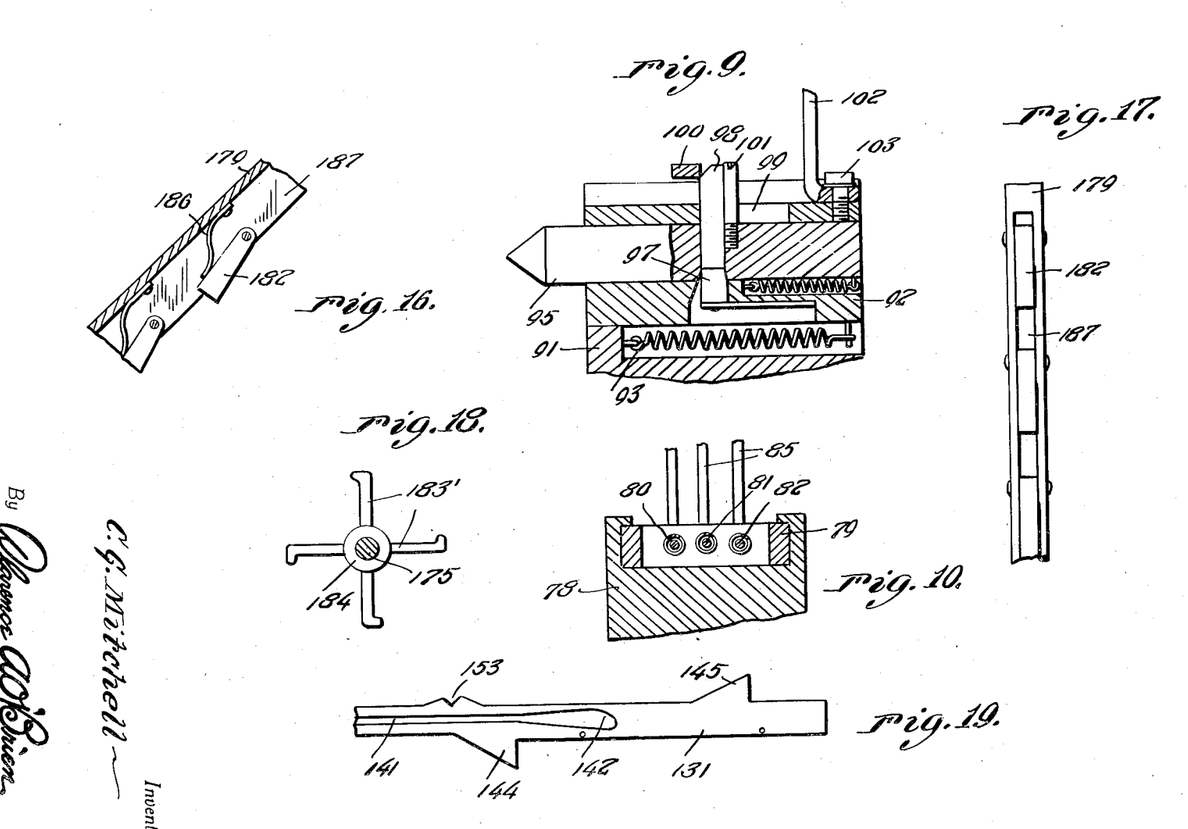
Figure 10 is a detail sectional view, taken substantially on the line 10—10 of Figure 3.
Figure 16 is a fragmentary longitudinal sectional view, through a portion of the reversing pedal.
Figure 17 is a fragmentary detail view, in elevation, showing a portion of the reversing pedal.
Figure 18 is a detail view, showing the device for locking the reversing mechanism.
Figure 19 is a detail view, in elevation, showing the outer or free end portion of the transmission locking rod, or bar.

The sleeve 133 is disposed over the slot 134, which is formed transversely in the rod 131, and said sleeve is provided with an opening in one side in communication with the slot 134. A coil spring 135 is mounted on the rod 131 and engages at one end with the sleeve 133, in a manner to yieldingly urge said sleeve, the yoke 129, and the slidable rod 131 forwardly. The slot 134 communicates with the forward end of a tapered bore 136, formed longitudinally in the slidable rod 131. A pawl 137 is pivotally mounted in the slot 134, and operable through the openings in the sleeve 133 for engagement with the rear side of the yoke 129, for releasably locking the slidable rod 131 and the yoke 129 together. A suitable operating cable 138 extends through the bore 136 of the slidable rod 131, and is connected to the pawl 137. A supporting plate 139 is mounted in the bore 136 through which the cable 138 slidably passes. A coil spring 140 encircles the forward end portion of the cable 138 and has one end impinged on the plate 139, and its opposite end impinged on the pawl 137, for yieldingly urging the cable 138 forwardly and swinging the pawl 137 to locking position as seen in Figure 11. Referring now to Figures 1 and 19 of the drawings, it will be seen that the outer or rear end portion of the slidable rod 131 has formed therein the longitudinally extending slot 141, with which the bore 136 communicates. At its rear end the slot 141 is enlarged as at 142. The cable 138 extends through the slot 141 and has its rear end connected to the upper end portion of a pawl 143, which is pivotally mounted on one side of the slidable rod 131. An integral abutment 144 depends from the lower side of the slidable rod 131, at a point spaced slightly forward of the pawl 143. An integral upstanding abutment 145 is mounted on the upper side of the slidable rod 131, in rearwardly spaced relation to the abutment 144. A lever 146 is pivotally mounted on a rear portion of the slidable rod 131 and has one end operatively connected to the pawl 143 by the rod 147. As illustrated in detail in Figure 12, a finger 148 is pivotally connected by a half hinge joint to the opposite end of the lever 146. The finger 148 is yieldingly retained in alignment with the lever 146 by a coil spring 149 which is connected with said finger and with the slidable rod 131. Attention is here directed to Figure 13 of the drawing, which shows on an enlarged scale a means for connecting the cable 138 and the rod 147 to opposite sides of the pawl 143. It will be noted that a pin 150 extends through the pawl 143, and is provided with the integral eyes 151, on its opposite ends. The pawl 143 is mounted for swinging movement on the pivot pin 152. The slidable rod 131 has formed thereon a raised portion provided with a substantially V-shaped notch 153, for the reception of a spring pressed latch 154 for releasably retaining said slidable rod 131 against movement.

A control bar 155 is provided with an offset end portion 156 extending beneath the slidable bar 131, and engageable with the abutment 144.

The pawl 143 is adapted for engagement with the end portion 156 of the control bar 155, for releasably locking said control bar and the slidable rod 131 together. At its forward end, the control bar 155 is coupled by a pin and slot connection to a lever 157 which is fulcrumed intermediate its ends on the bracket 158 on the dash board 3. At its upper end portion, the lever 157 is coupled by a pin and slot connection to the forward end portion of the rod 159, which extends slidably through a suitable depending bracket 160 and through the instrument board 5 of the vehicle and terminates in a pistol grip handle 161. A suitable manually operable latch mechanism 162 is mounted on the bar 159 for co-action with the notched plate 163 for releasably securing the bar 159 in adjusted position against movement.

A brake operating bar 163 has its forward end portion coupled by a pin and slot connection to the lower end portion of a lever 164, which has an intermediate portion fulcrumed on the bracket 158 and which has its upper end portion coupled by a pin and slot connection to a bar 165.

The bar 165 is also slidable through the brackets 160 and the instrument board 5 of the vehicle, and terminates in a pistol grip handle 166. A suitable latch device 167 is mounted on the bar 165 for engagement with a notched plate similar to the plate 163 (not shown).

The rear end portion of the bar 163 has hingedly connected thereto a substantially L-shaped extension 168, to which the brake rod 169 is connected. The free end of the extension 168 has formed integrally thereon an angular lug 170 engageable with the hinged finger 148, in a manner to cause the lever 146 to swing in one direction to shift the pawl 143 out of engagement with the portion 156 of the control bar 155. The lug 170 is also engageable with the abutment 145, on the slidable rod 131, for shifting said rod forwardly under certain conditions. The extension 168 has formed thereon a cam 171, engageable, after a predetermined forward movement of the bar 163, with the cam face 172 on the bracket 173 for swinging the extension 168 upwardly and out of engagement with the abutment 145. A flat spring 174 is mounted on the rear end portion of the bar 163, and is engaged with the extension 168 in a manner to return said extension to its normal horizontally disposed position when the cams 171 and 172 are disengaged.

A shaft 175 is journaled in suitable bearings 176 forwardly of the housing 7 and fixed on the said shaft is a disc 177, to which one end of a rod 178 is eccentrically connected. The opposite end of the rod 178 is connected to the upper end portion of the lever 66, which projects upwardly through the cover of the housing 7.

A foot operated plunger 179 extends slidably through the toe board 2 of the vehicle and a bearing plate 180 and is yieldingly turned toward raised position by the coil spring 181. As clearly seen in Figure 1 of the drawings, the plunger 179 is disposed at an inclination and extends adjacent the shaft 175. The lower side of the plunger 179 is longitudinally channeled to receive the series of pivoted pawls 182, which are adapted to engage the gear 183, fixed to the shaft 175, for rotating said disc in one direction upon downward movement of the plunger 179, but permitting said gear 183 to remain stationary upon upward movement of the plunger. Radiating arms 183' extend from a hub 184 which is fixed on the shaft 175. A resilient bar 185 (see Figure 1) is adapted for engagement with pairs of the arms 183', for releasably retaining the shaft 175 against rotation in predetermined positions. As seen in Figure 16 of the drawings, the pawls 182 are yieldably urged outwardly by the springs 186, which are mounted in the channel in the plunger 179, said channel being designated by the reference numeral 187. An intermediate gear (not shown) is mounted on the stub shaft 188, and is constantly in mesh with the gears 62 and 69. Thus, when the slidable gear 64 is engaged with the gear 70, the driven shaft 61 will be rotated in a direction opposite to the direction of rotation of the drive shaft 11.

In operation, when the engine is accelerated by manual operation of the carburetor, the sleeve 13 is moved forwardly on the drive shaft 11, by the weighted elements 21, against the tension of the coil spring 41. The drive shaft 11 imparts rotary movement to the shaft 25, through the reduction gears 26. The forward movement of the sleeve 13 moves the tube 27 rearwardly on the shaft 25, through the medium of the lever 37. When the sleeve 27 moves rearwardly, the cone 28 engages the finger 117, and actuates the levers 115 and 113 to permit the plunger 108 to move toward the drive shaft 11, independently of its sleeve 106. As the sleeve travels forwardly, a plunger 108 rides down the tapered side 15 of the head 14 in the spiral groove 16. The aforesaid movement of the lever 113 disengages the bell crank 112 from the spring pressed latch 111, and when the plunger 108 is engaged with the untoothed forward portion of the sleeve 13, the latch 111 locks said plunger and the sleeve 106 together.

The cone 28 engages the plunger 80 and moves said plunger away from the shaft 25 against the tension of the coil spring, and in a manner to shift the rod 85 engaged therewith.

The said rod 85 rocks the said lever 87, in a manner to actuate the throttle valve of the carburetor through the link 89 and reduce the speed of the engine. As the plunger 80 rides up the cone 28, the plunger 94 engages in the spiral groove on the rear tapered side of the flange 29, and said plunger 94 is forced away from the shaft 25, together with its respective sleeve 92, which is locked to said plunger 94, by the latch 97. As the plunger 80 rides up the cone 28, and the speed of operation of the engine is reduced, the weighted element 21 will discontinue moving the sleeve 13 forwardly, in a manner to move the tube 27 rearwardly through the medium of the lever 37, but the rearward movement of the tube 27 will be continued by reason of the fact that the plunger 94 is engaged in the spiral groove in the tapered rear side of the flange 29. When the plunger 94 reaches the periphery of the flange 29, the low or first speed clutch will be engaged through the medium of the rod 104, and the arms 77, which are connected with the sleeve 92 in the bracket 90.

As this occurs, the plunger 80 passes and drops over the forward end of the cone 28 and the speed of operation of the engine is again increased. The lever 37 is again engaged with the forward end of the tube 27 by the sleeve 13 and said sleeve again constitutes the means for moving the tube rearwardly on the shaft 25. The flange 29 passes beneath the plunger 94, and as said plunger 94 starts down the forward spirally grooved side of the flange 29, the plunger 95 engages with the rear spirally grooved tapered side of the flange 30, and thus the low or first speed clutch is disengaged and the intermediate or second speed clutch is moved toward engaging position. The cone 28 engages the plunger 81 and the speed of the engine is again reduced, while the low speed clutch is being disengaged and the intermediate speed clutch is being engaged. After the intermediate speed clutch is engaged, the plunger 81 drops over the forward end of the cone 28 and the engine is again accelerated. The plunger 95 functions in a manner similar to the plunger 94 for causing a continuance of the rearward movement of the tube 27 when the speed of the engine is reduced by the engagement of the cone 28 with the plunger 81. As will be apparent, this is accomplished by engagement of the plunger 95 in the spiral groove in the rear tapered side of the flange 30. The flange 30 passes rearwardly beneath the plunger 95, and as said plunger 95 starts down the forward tapered side of said flange 30, the plunger 96 starts up the rear tapered side of said flange 30. As the plunger 95 moves down the forward side of the flange 30, the intermediate clutch is disengaged and the high speed clutch is engaged and during this operation, the cone 28 engages the plunger 82 to again reduce the speed of the engine. The plunger 96 causes a continued rearward movement of the tube 27, while the engine is thus slowed down by engageing in the spiral groove in the rear side of the flange 30. When the plunger 96 reaches the periphery of the flange 30, the plunger 82 drops over the forward end of the cone 28, and the engine is again accelerated to drive the automobile in high gear. Before the transmission begins to function in a manner to successively engage the clutches, the operator of the vehicle adjusts the bar 159 in a manner to dispose and secure the yoke 129 at such a point relative to the shaft 25, that the rearward movement of the tube 27 will engage with said yoke and be arrested thereby with the flange 30 disposed with its periphery in engagement with the plunger 96. In this manner, the high speed clutch is retained in engaged position. Should it be desired to propel the vehicle in first or second speeds, as when heavily loaded or on a hill, the yoke 129 is shifted to a position to retain the tube 27 against rearward movement at a point where the flange 29 will be engaged with the plunger 94 or the flange 30 will be engaged with the plunger 95, while the clutches are being successively engaged the speed of operation of the engine is reduced only momentarily and not long enough to permit the sleeve 13 to return to its inoperative position, in which position the plunger 108 would be engaged with the periphery of the head 14.

In Figure 3 of the drawings, and also in Figure 4, the slidable gear 64 is engaged with the gear 70 and the automobile will be propelled rearwardly. When it is desired to move the automobile forwardly, the gear 64 is shifted to engage the clutch teeth 65 with the clutch teeth 63 on the gear 62 to hold the shaft 61 directly to the stub shaft 43.

When it is desired to again disconnect the driven shaft 61 from the driving shaft 11, the throttle valve of the carburetor is manually operated by the usual foot, and hand actuated means to reduce the speed of the engine and the weighted elements 21 return the sleeve 13 to its inoperative position as seen in the drawings. The plunger 108 is moved in a direction away from the drive shaft 11 by the head 14, and carries with it the sleeve 106, which is now locked thereto, by the lock 111. This movement of the sleeve 106 shifts the frame 79 away from the shaft 25 and moves the plungers 80, 81 and 82 out of the path of the cone 28. This is accomplished through the medium of the rod 120. This movement of the sleeve 106 also rocks the bell crank lever 122 through the medium of the rod 121 and the bell crank levers 100 are actuated from the bell crank lever 122 by their respective operating rods. The bell crank levers 100 engage the tapered ends of the slidable bolts 98 in a manner to force said bolts inwardly and disengage the latches 97 from the plungers 94, 95 and 96, thus releasing said plungers from their respective sleeves 92.

The bell crank levers 100 then engage with the pins 101, in a manner to shift the plungers 94, 95 and 96 away from the shaft 25 and out of the path of the flanges 29 and 30. Suitable springs are provided for yieldingly urging sliding movement of the plunger 108 toward the drive shaft 11, relative to its sleeve 106, and similar springs are engaged with the plungers 94, 95 and 96, for urging same toward the shaft 25, relative to their respective sleeves.

The operator of the vehicle then slides the bar 165 rearwardly in a manner to move the brace bar 163 forwardly. The initial forward movement of the brace bar 163 engages the free end of the extension 168, with the finger 148 on the lever 146 and said lever is swung in a direction to disengage the pawl 143, from the angular end portion 156 of the locking bar 155. In this manner, the bar 155 is unlocked from the slidable bar 131. When the pawl 143 is swung to inoperative position, the pawl 137 is also swung inwardly to inoperative position out of engagement with the yoke 129 through the medium of the cable 138, which is connected with the pawl 143. The yoke 129 and the sleeve 133 may now slide rearwardly on the bar 131 against the tension of the coil spring 135.

The slidable tube 27 is moved forwardly by the coil spring 128. The bar 163 continues to move forwardly and the cam 171 engages the cam 172 and the extension 168 is swung out of engagement with the abutment 145.

The brake bar 163 may then continue to move forwardly independent of the slidable bar 131 for applying the brakes of the automobile through the rod 169. The slidable bar 131 may be releasably retained in its forwardmost position, by engagement of the keeper 154 in the notch 153.

When the foot plunger 179 is depressed, the pawls 182 engage with the gear 183 to rotate the shaft 175, and the lever 66 is operated to shift the gear 64 through the medium of the rod 178. The spring member 185 will engage with the free ends of a pair of the arms 183' in a manner to cause the shaft 175 to be disposed in predetermined positions when inoperative, said position being such that the gear 64 is retained either in neutral position or in engagement with the gear 70 or in a position with the clutches 65 and 63 engaged. When it is desired that the vehicle be moved forwardly, the clutches 65 and 63 are engaged. When it is desired that the vehicle be propelled rearwardly, the plunger 179 is depressed to rotate the shaft 175 one-half of a revolution and the gear 64 is shifted into engagement with the gear 70. As before explained, the pawls 182 permit the plunger 179 to be returned to raised position by the coil spring 181, without rotating the gear 183 and the shaft 175.

When the tube 27 returns to its inoperative position, the cone 28 engages the free end of the lever 115 and swings the same in a manner to actuate the lever 113, which, in turn, operates the bell crank lever 112, on the bracket 105 to shift the latch 111 out of engagement with the plunger 108 and thus unlock said plunger from its sleeve 106. The sleeve 106 may then return to its former position together with the frame 79 and the bell crank levers 100. This again disposes the plungers 80, 81, and 82, in the path of the cone 28, and the plungers 94, 95 and 96 in the path of the flanges 29 and 30, when the operation of the transmission is ready to be repeated.

It is believed that the many advantages of a transmission constructed in accordance with this invention will be readily understood, and although the preferred embodiment of the invention is as illustrated and described, it is to be understood that changes in the details of construction may be had, which will fall within the scope of the invention as claimed.

What is claimed is:

1. A transmission for vehicles of the character described comprising a housing, a drive shaft extending rotatably into the housing, said drive shaft connected to the engine of the vehicle, a driven shaft extending rotatably into the housing, means for selectively coupling the driven shaft to the drive shaft for actuation thereby at various speeds, said means including a series of clutches, another shaft mounted rotatably in the housing and operatively connected to the drive shaft, a tube splined on the third named shaft, a speed responsive device mounted on the drive shaft and operatively connected to the tube, in a manner to move said tube longitudinally on the third named shaft, a series of plungers slidably mounted in the housing adjacent the third named shaft, means operatively connecting one of the plungers to each of the clutches, flanges on the tube engageable with the plungers for actuating the same in a manner to engage and disengage the clutches.

2. A transmission for vehicles of the character described comprising a housing, a drive shaft extending rotatably into the housing, said drive shaft connected to the engine of the vehicle, a driven shaft extending rotatably into the housing, means for selectively coupling the driven shaft to the drive shaft for actuation thereby at various speeds, said means including a series of clutches, another shaft mounted rotatably in the housing and operatively connected to the drive shaft, a tube splined on the third named shaft, a speed responsive device mounted on the drive shaft and operatively connected to the tube, in a manner to move said tube longitudinally on the third named shaft, a series of plungers slidably mounted in the housing adjacent the third named shaft, means operatively connecting one of the plungers to each of the clutches, flanges on the tube engageable with the plungers for actuating the same in a manner to engage and disengage the clutches, manually adjustable means mounted in the housing and engageable with the tube, in a manner to arrest the sliding movement of said tube, under the impulse of the speed responsive means, a conical head on the tube, another series of plungers slidably mounted in the housing for successive engagement by the conical head for actuation thereby, and means operatively connecting each of the last named plungers to the carburetor of the engine for reducing the speed of operation of the engine when the plungers are actuated by the conical head.

3. A transmission for vehicles of the character described comprising a housing, a drive shaft extending rotatably into the housing, said drive shaft connected to the engine of the vehicle, a driven shaft extending rotatably into the housing, means for selectively coupling the driven shaft to the drive shaft for actuation thereby at various speeds, said means including a series of clutches, another shaft mounted rotatably in the housing and operatively connected to the drive shaft, a tube splined on the third named shaft, a speed responsive device mounted on the drive shaft and operatively connected to the tube, in a manner to move said tube longitudinally on the third named shaft, a series of plungers slidably mounted in the housing adjacent the third named shaft, means operatively connecting one of the plungers to each of the clutches, flanges on the tube engageable with the plungers for actuating the same in a manner to engage and disengage the clutches, manually adjustable means mounted in the housing and engageable with the tube, in a manner to arrest the sliding movement of said tube, under the impulse of the speed responsive means, a conical head on the tube, another series of plungers slidably mounted in the housing for successive engagement by the conical head for actuation thereby, and means operatively connecting each of the last named plungers to the carburetor of the engine for reducing the speed of operation of the engine when the plungers are actuated by the conical head, means mounted in the housing and connected with the plungers for shifting said plungers out of the path of the flanges and the conical head, the last named means operatively engaged with the speed responsive means for actuation thereby.

In testimony whereof I affix my signature.

CHARLES GOODYEAR MITCHELL.